INVENTOR.
RONALD W. DANKLEFS
BY
Christie, Parker & Hale
ATTORNEYS.

INVENTOR.
RONALD W. DANKLEFS
BY Christie, Parker & Hale
ATTORNEYS.

June 14, 1960 R. W. DANKLEFS 2,940,680

REEL BRAKE

Filed Feb. 3, 1958 3 Sheets-Sheet 3

INVENTOR.
RONALD W. DANKLEFS
BY
Christie, Parker & Hale
ATTORNEYS.

United States Patent Office 2,940,680

Patented June 14, 1960

2,940,680

REEL BRAKE

Ronald W. Danklefs, Pasadena, Calif., assignor to Burroughs Corporation, Detroit, Mich., a corporation of Michigan Filed Feb. 3, 1958, Ser. No. 713,031

4 Claims. (Cl. 242—55.12)

This invention relates to a brake mechanism and more particularly to brake mechanisms for winding and reeling devices.

In the field of winding and reeling devices for magnetic tapes it is necessary to run the magnetic tape across a read-write head when extracting information from or adding information to the tape. It is desirable to run the tape across the read-write head at a substantially constant linear speed. If magnetic tape is run from one reel to another and the coil of tape on one reel is greater or less than the coil of magnetic tape on the other reel, then the speeds at which the reels are rotated must be different in order for the tape to move at a constant linear velocity between the reels. Since the reels are operated at different revolutions per unit of time, they are usually driven by separate drive motors independently controlled. It is customary to use a vacuum column between the reels and run a loop of tape therethrough. This loop serves as a reserve which may be added to or subtracted from in order to provide for some error in the rotational speeds of the reels without creating tension in the tape or unwinding more than is being wound. If such a winding and reeling device is operated without a brake mechanism, any one of several undesirable possibilities may occur in the event power is terminated, accidentally or intentionally, to the drive motors. First, the situation may be where the reel unwinding tape is rotating at a higher rotational velocity than the reel that is winding tape. Loss of power to the drive motors at this point results in unrolling more tape than is being wound, and consequently a quantity of tape may be unraveled. In some instances the quantity of tape unraveled is quite large, causing the excess tape to be piled up around the tape machine. Second, the situation may be presented where the reel winding tape is rotating at a higher velocity than the reel unwinding tape. A loss of power to the drive motor at this point creates a tension in the tape between the reels having a magnitude determined by the inertia of the two reels and their difference in rotational velocity. This tension is often sufficient to break the magnetic tape, and some information stored on the tape is lost where the break occurs. Third, the situation may develop where, because of independent control of each drive motor, both reels at a particular instant of time are winding tape onto themselves when power to the drive motors is terminated. This too many create enough tension to break the magnetic tape. Fourth, because of independent control of each drive motor, the situation may develop where both reels at a particular instant of time are unwinding tape when power to the drive motors is terminated. The result is to unwind tape from both reels, and in some instances, the quantity of unwound tape may be quite large, causing the excess to be piled up around the tape machine. It is desirable, therefore, to provide a brake mechanism which stops the reels in any one of the foregoing instances whenever power is terminated to the drive motors and thereby prevent either unraveling the tape unnecessarily or breaking it with the consequent loss of stored information.

In order to overcome the foregoing disadvantages, a brake mechanism is provided according to the present invention which may serve to bring both reels of a winding and reeling device to a halt whenever power to the drive motors is terminated for any reason. For this purpose decelerating torque must be applied as rapidly as possible after power is shut off, and it is preferable to apply a constant decelerating torque independent of the rotational velocity of the reel and coefficient of friction of the brake mechanism. Since the brake mechanism is employed after power to the drive motors is terminated, it must be operated independently of the power supplied to the drive motors. It is preferable, therefore, to actuate the brake mechanism independently of any outside source of power. For this purpose a spring loaded brake band may be utilized, and when the spring is cocked the brake band floats. The spring is held in the cocked position by a low inertia trigger mechanism, preferably a magnetic latch energized by the source of power applied to the drive motors. The springs may be cocked by any suitable mechanism such as a hydraulic or air actuated piston which retracts out of the way after the springs are cocked. Since the magnetic latch is energized by the same power supplied to the drive motors, the magnetic latch is de-energized when power to the motors is terminated. As soon as the magnetic latch is de-energized the low inertia trigger mechanism is operated, and the springs force the brake bands against the brake drums. A constant decelerating torque is applied to the brake drums until they are brought to a halt.

The torque (T) applied to the drum is substantially independent of the coefficient of friction and the direction of rotation. When the ends of the brake band are brought toward each other under force of the spring to tighten the brake band on the brake drum, the torque (T) on the drum can be shown as $$T=\frac{e^{ua}-1}{e^{ua}}$$

where:

$F$=force of the spring
$r$=the radius of the brake drum
$u$=coefficient of friction
$a$=angle of wrap In the case where the brake band covers substantially the entire periphery of the brake drum the angle of wrap is $2\pi$. If the material of the brake band is selected with the coefficient of friction of 0.5 then $e^{ua}>e\pi>>1$ then $$\frac{e^{ua}-1}{e^{ua}}\approx\frac{e^{ua}}{e^{ua}}\approx 1$$

Thus $T\approx Fr$ or $T=Fr$ from a practical standpoint within ±5%. Therefore the torque applied to the drum is determined primarily by the radius ($r$) and the spring force (F). The force of the spring is made adjustable so that the braking torque and therefore the braking acceleration can be adjusted as desired. In practice the energy required to stop each reel of a winding and reeling device of this sort is approximately the same because the reel which has a smaller coil of tape travels faster than the reel with a larger coil of tape. Hence the relationship is such that the rotational energy determined by mass times the velocity squared of one reel is substantially equal to the rotational energy of the other reel, the increase in velocity in one reel being counterbalanced by the increase in mass in the other reel. Thus the application of substantially constant and equal braking forces brings both reels to a halt at about the same instant. This highly beneficial result serves to prevent tensioning of the tape should the unwinding reel stop first or unraveling tape should the winding reel stop first.

These and other features of this invention may be more fully appreciated when considered in the light of the following specification and drawings in which.

Figure 1:
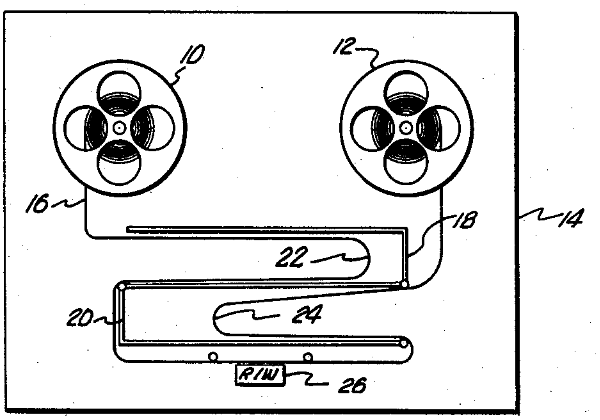
Fig. 1 is a front view of a winding and reeling device incorporating the principles of the present invention.

Referring first to Fig. 1, a winding and reeling device incorporating the features of this invention includes a pair of reels 10 and 12 mounted on a panel or face plate 14. A tape 16 is fed into a pair of vacuum columns 18 and 20, forming respective loops 22 and 24 in these vacuum columns. As the tape is wound from either reel onto the other, it passes in and out of these columns and across a read-write head 26 where information is extracted or added to the tape.

Figure 4:
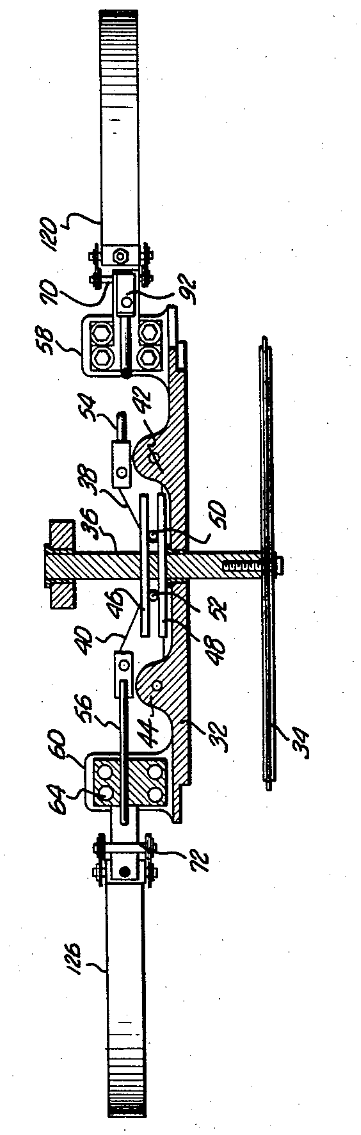
Fig. 4 is a cross-sectional view taken on the line 4—4 of Fig. 3.
Figure 2:
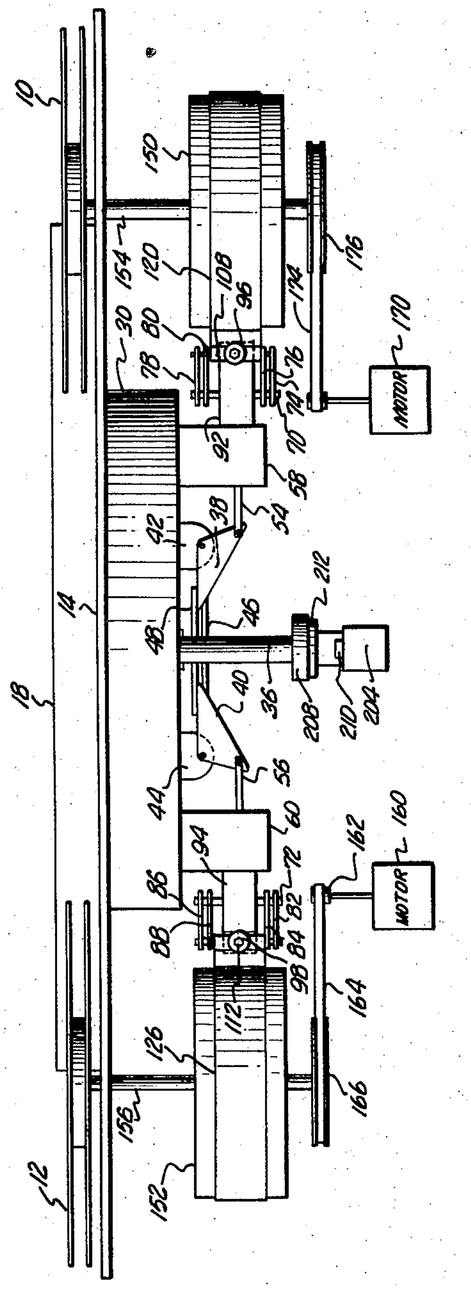
Fig. 2 is a plan view of Fig. 1.
Figures 3, 5:
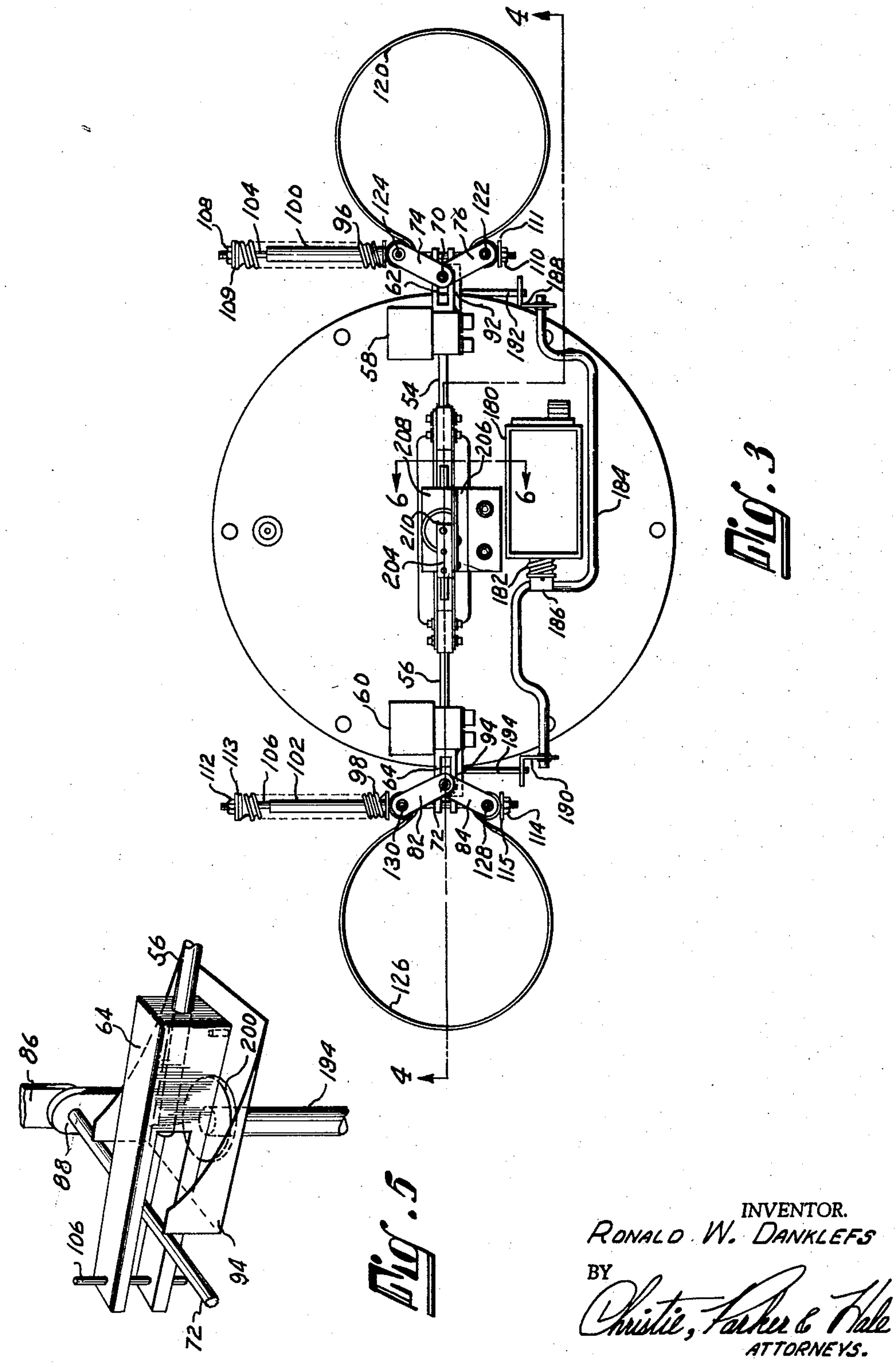
Fig. 3 is a rear view of the devices of Fig. 1.
Fig. 5 is an exploded view showing in perspective a latch mechanism employed in Fig. 3.

Reference is made to Figs. 2 through 4 for a more detailed illustration of a brake control mechanism according to the present invention. Referring more specifically to Fig. 2, an air cylinder 30 is mounted on the back side of the panel or face plate 14. As shown in Fig. 4 the cylinder includes a base plate 32 with a piston 34 connected to a piston rod 36. When the piston 34 is actuated back and forth within the cylinder 30, the piston rod 36 moves in and out a corresponding amount through the base plate 32. Referring again to Fig. 2, a pair of rockers 38 and 40 are pivotally secured to respective rocker supports 42 and 44, preferably formed in the cylinder base plate 32. As shown in Figs. 2 and 4, a pair of guide pins 46 and 48 are secured to and move with the piston rod 36. A pair of depending lugs 59 and 52 are mounted on the respective rockers 38 and 40 and projected between the pair of guide pins 46 and 48. When the piston rod 36 moves in and out, the guide pins 46 and 48 engage the depending lugs 50 and 52 and rotate the rockers 38 and 40 about their respective pivotal connections on the rocker supports 42 and 44. Rotational movement of the rockers 38 and 40 is translated into linear movement to the right and left in respective push rods 54 and 56. Mounting blocks 58 and 60 are preferably formed integrally with the base plate 32. Two U-shaped members 62 and 64 are spaced from the base plate 32 and secured to respective mounting blocks 58 and 60. The push rods 54 and 56 extend through bores in associated U-shaped members 62 and 64 and abut against corresponding link shafts 70 and 72. These shafts are mounted for lateral movement within the U-shaped members 62 and 64. When the piston rod 36 moves out this forces the push rods 54 and 56 laterally to the right and left respectively against corresponding link shafts 70 and 72, forcing them outwardly to the right and left respectively. As shown in Fig. 3, the link shaft 70 pivotally joins a pair of links 74 and 76 on one end thereof, and as better seen in Fig. 2 this link shaft engages a similar pair of links 78 and 80 on the other end thereof. The link shaft 72 in Fig. 3 pivotally joins a pair of links 82 and 84 on one end thereof, and as better shown in Figs. 2 and 5 this link shaft engages a similar pair of links 86 and 88 on the other end thereof. When the push rods 54 and 56 in Fig. 3 are forced outwardly to the right and left respectively, the associated link shafts 70 and 72 are likewise forced outwardly, and as the link shafts move outwardly they pass over respective latch members 92 and 94. The latch members 92 and 94 are spring-like members fastened to the lower side of corresponding U-shaped members 62 and 64, and the latch members are forced downwardly against their spring tension as the respective link shafts are forced outwardly. As soon as the link shafts 70 and 72 progress sufficiently far to the right and left respectively to clear the associated latch members, the latch members move upwardly behind the associated link shafts and prevent them from moving back. As the link shafts 70 and 72 are forced to their ultimate or locked positions to the right and left respectively, the lower ends of respective springs 96 and 98 are forced upwardly thereby compressing these springs. The springs 96 and 98 are disposed over corresponding sleeves 100 and 102 which in turn are mounted over respective spring guide rods 104 and 106. A pair of nuts 108 and 110 threadedly engage opposite ends of the spring guide rod 104 against corresponding washers 109 and 111 to hold the assembly intact. In a similar fashion a pair of nuts 112 and 114 threadedly engage opposite ends of the spring guide rod 106 against corresponding washers 113 and 115 to hold the associated assembly intact. The nuts 108 and 112 may be adjusted to vary the force of compression in the respective springs 96 and 98. A brake band 120 is secured at each end to associated shafts 122 and 124 as by bending around thereon. Likewise a brake band 126 is secured at each end to associated shafts 128 and 130 as by bending around thereon.

As seen in Fig. 2, the brake bands 120 and 126 engage respective brake drums 150 and 152 disposed on corresponding shafts 154 and 156. An electric motor 160 drives a pulley sheave 162 which in turn drives a belt 164 and a pulley sheave 166. The sheave 166 is secured to the shaft 156 which in turn is coupled to the reel 12. The rotattional speed of the reel 12 is controlled by the motor 160. In a similar fashion an electric motor 170 drives a pulley sheave 172 which in turn drives a belt 174 and a pulley sheave 176. The sheave 176 is joined to the shaft 154 which in turn is coupled to the reel 10. The rotational speed of the reel 10 is controlled by the motor 170. The speed of the motors 160 and 170 may be controlled independently by various suitable devices known in the art. Such control devices constitute no part of the present invention and are not described.

Referring now to Fig. 3, a solenoid 180 is energized whenever the motors 160 and 170 are energized. When the power to the motors is shut off, the power to the solenoid 180 is removed. A spring 182 and a solenoid rod 184 are secured together by means of a retainer 186. The solenoid rod 184 is joined by a pair of connectors 188 and 190 to respective trigger rods 192 and 194. When the solenoid 180 is energized the solenoid rod 184 is forced to the left in the position shown, and the spring 182 is placed under tension. When the solenoid 180 is de-energized, the tension of the spring 182 moves the solenoid rod 184 to the right; this moves the lower ends of the trigger rods 192 and 194 to the right and forces the latch members 92 and 94 downwardly until the link shafts 72 and 74 are released; whereupon these link shafts move inwardly under the force of compression in the respective springs 96 and 98.

In order to illustrate how the trigger rods 192 and 194 release the latch members 92 and 94, reference is made to Fig. 5 which shows in perspective form an exploded view of the parts in Figs. 2 and 3 associated with the trigger rod 194. The trigger rod 194 has a head 200 which lies on the upper surface of the latch member 94. The lower surface of the U-shaped member 64 lies over the top of the head 200. When the solenoid rod 184 is positioned as shown in Fig. 3, the trigger rod 194 is substantially vertical, and the head 200 lies substantially in a horizontal plane. When the solenoid rod 184 is moved to the right by de-energization of the solenoid 180, this forces the lower end of the trigger rod 194 to the right, and the head 200 is turned between the U-shaped member 64 and the latch member 94 in a manner such that the right periphery of the head engages the lower side of the U-shaped member 64 and the left periphery of the head 200 engages the latch member 94. As the trigger rod 194 is moved to the right and the head 200 is further turned, the left end of the latch member 94 is forced downwardly by the left portion of the head 200 since the U-shaped member 64 is held rigidly in position, preventing upward movement of the right periphery of the head 200. As soon as the left end of the latch member 94 moves down below the lower side of the link shaft 72, this shaft, as better seen in Fig. 3, is moved to the right by the force of compression in the spring 98. The latch member 92 in Figs. 2 and 3 is the same in construction and operation as the latch member 94 shown in Fig. 5. It is readily seen that if the lower end of the trigger rod 192 in Fig. 3 is moved to the right, the right periphery of the head associated with the trigger rod 192 is held against the rigid U-shaped member 62 while the left periphery of this head moves downwardly and forces the right end of the latch member 92 downwardly. As soon as the latch member 92 moves below the link shaft 70, this shaft is moved to the left by the force of compression in the spring 96.

In order to cock the spring actuated brake mechanisms, air under pressure is supplied, by means not shown, to the air cylinder 30 in Fig. 2 and employed to compress the springs 96 and 98. The piston 34 (Fig. 4) positioned within the air cylinder 30 of Fig. 2 is forced to the rear when air under pressure is supplied to the forward face thereof. This causes the piston rod 36 to move to the rear of the device or downwardly as viewed in Fig. 2. As soon as the piston rod 36 moves sufficiently far down in Fig. 2 for the latch members 92 and 94 to move in behind the respective link shafts 70 and 72, the brake mechanism is cocked, and it is desirable then to remove air under pressure from the forward face of the piston 34, apply it to the rear face thereof, and force the piston rod 36 to the front of the device or upwardly in Fig. 2. This withdraws the push rods 54 and 56 inwardly and permits room for the link shafts 70 and 72 to move inwardly when released. For the purpose of controlling the proper application of air pressure to each side of the piston 34, a switch 204 is employed. It is mounted in the line of movement of the piston rod 36.

Figure 6:
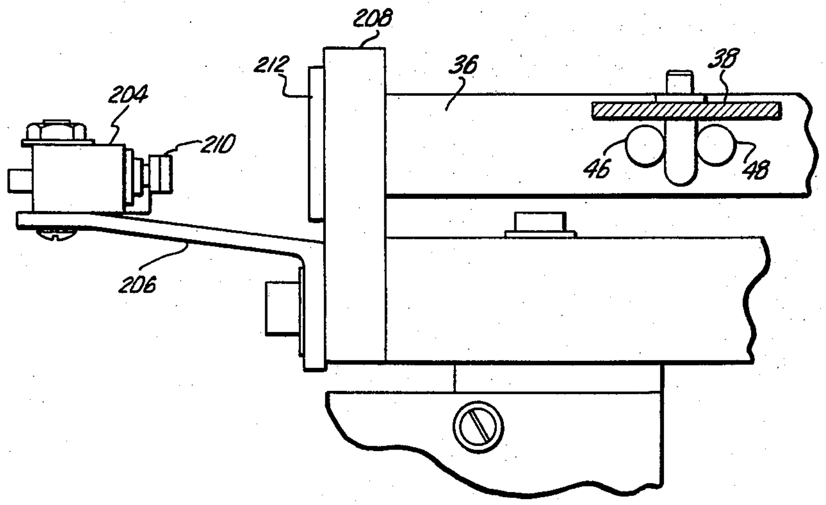
Fig. 6 is a side elevation taken on the line 6—6 in Fig. 3.

As shown in exploded form in Fig. 6, the switch 204 is mounted on a bracket 206 which in turn is secured to a guide member 208. This guide member serves to steady the rear end of the piston rod 36 and direct it toward the contact 210 of the switch 204. An end member 212 secured to the piston rod 36 engages the switch contact 210.

During normal operation the reels 10 and 12 of Figs. 1 and 2 are usually driven at different speeds by the respective motors 160 and 170. If the power to the motors 160 and 170 were removed and brakes not applied to stop the reels 10 and 12, it is possible that a quantity of tape would be unwound from one reel and not taken up by the opposite reel; it is also possible htat one reel may tend to pull tape from the other reel with sufficient force to break the tape because of the difference in the reels of speed or inertia or both. In the one case a quantity of tape, unwound from one reel and not taken up by the other, may be scattered about on the floor; whereas in the other case the tape may be broken and some information lost. In either case an undesirable result occurs. With a brake mechanism according to the present invention the motors 160 and 170 are permitted to drive respective reels 12 and 10 at different speeds during normal operation. In the event of loss of power to these motors, the brake mechanisms associated with the respective brake bands 150 and 152 are operated to clamp down on the respective brake drums 120 and 126. This actuation of the brakes is brought about because the solenoid 180 is de-energized whenever the motors 160 and 170 are de-energized.

In order to illustrate the operation of the present invention assume that the motors 160 and 170 are de-energized and the brake bands 120 and 126 in Fig. 2 tightly engage the brake drums 150 and 152. In order to release the brakes, air under pressure is supplied to the forward face of the piston 34 in the air cylinder 30. This forces the piston rod 36 out through the base plate 32 (Fig. 4) of the air cylinder 30. This movement of the piston rod 36 rotates the rockers 38 and 40 in Fig. 2 about their pivotal connections on the mounting blocks 42 and 44 and forces the push rods 54 and 56 outwardly to the right and left respectively. As a result the push rods 54 and 56 engage associated link shafts 70 and 72 and force them outwardly to the right and left respectively. As better seen in Fig. 3 this forces the links associated with the link shafts 70 and 72 upwardly, thereby compressing associated springs 96 and 98. When the link shafts 70 and 72 move to the right and left sufficiently far, corresponding latch members 92 and 94 snap in behind the link shafts and hold them firmly in position. In this position the brake mechanism is said to be cocked. With the shafts 124 and 130 in their uppermost position the circumference of the brake bands 120 and 126 is greater than the circumference of the associated brake drums 150 and 152. Hence these drums are permitted to rotate freely within the associated brake bands. The motors 160 and 170 may then be energized and their speeds regulated to rotate the reels 10 and 12 as desired. The piston rod 36 in Fig. 2 continues to move through the guide member 208 until it engages the contact 210 of the switch 204 at which time air pressure to the forward face of the piston 34 is removed and applied to the rear face of the piston 34. Consequently, the piston rod 36 moves back into the cylinder 30 in Fig. 2 until the piston 34 reaches the forward extent of its movement. At this point a mechanically operated release mechanism may be employed to shut off high pressure air, if desired. Any other suitable mechanism, not shown, may be employed to remove the air under pressure to the cylinder 30 at this point. Movement of the piston rod 36 to its forward position causes the pins 46 and 48 to rotate rocker arms 38 and 40 to the position shown in Fig. 2. Consequently, push rods 54 and 56 are withdrawn from engagement with the respective link shafts 70 and 72, thereby providing room for these shafts to move inwardly when the latch members 92 and 94 are released or tripped.

If subsequently the power is shut off to the motor 160, the motor 170 and the solenoid 180, this loss of power to the solenoid 180 causes the solenoid rod 184 to move to the right because of tension in the spring 182. As noted previously the solenoid rod 184 is forced away from the solenoid 180 against the force of the spring 182 by the magnetic field of the solenoid. Thus when the solenoid 180 is de-energized the force stored in the spring 182 is used to force the solenoid rod 184 to the right. This causes the trigger rods 192 and 194 to depress the corresponding latch members 92 and 94 which in turn allows the link shafts 70 and 72 to move inwardly to the left and right respectively as the shafts 124 and 130 are forced downwardly by the associated springs 96 and 98. As the shafts 124 and 130 are forced downwardly the circumference of associated brake bands 120 and 126 is decreased, and these brake bands grip the corresponding brake drums 150 and 152, shown in Fig. 2. Accordingly, the reels 10 and 12 are brought to a halt as the associated brake bands engage the corresponding brake drums.

What is claimed is:

1. In tape apparatus for reel to reel tape transports, a pair of tape reel drive shafts having a brake drum mounted thereon, a drive motor coupled to drive each of said shafts, a brake band for each of said brake drums adapted to loosely encircle each of said brake drums and capable of stopping the rotation of said drive shafts when placed in frictional engagement with said brake drums, two pair of spaced link members for each of said brake bands with each members of each pair having an end connected to a different end of the individual brake band, a link shaft for each of said two pairs of link members pivotally connecting the remaining ends of each pair of link members, a bifurcated block for each of said link shafts arranged to loosely receive said link shafts at the bifurcated end, a pair of spring mounting rods rigidly supported adjacent the bifurcated ends of said blocks, a spring secured to each of said rods to bear against said link members to urge the ends connected to the brake band together and thereby urge said bands into engagement with their drums, a push rod movably mounted in said blocks and extending into the bifurcated end to urge said link shafts toward said spring mounting rods, means operatively connected to said push rods to move them into engagement with their respective link shafts to move the ends of the link members connected to the brake bands away from one another and thereby disengage said bands from their drums, latch means pivotally connected to each of said blocks and defined to extend into the path of movement of said link shafts and to yieldingly allow said shafts to pass beyond same whereby to restrain the return of said shafts to thereby lock said link members in an extended position and the brake bands in a floating position, a member arranged with each of said blocks and said latch means to pivot the latter for disengaging said link shafts to allow the springs to apply said brake bands, and operating means responsive to the de-energization of said motors and connected to each of said latter mentioned members for effecting the pivoting action of said latch means upon the de-energization of said motors.

2. In tape apparatus for reel to reel tape transports, a pair of tape reel drive shafts having a brake drum mounted thereon, a drive motor coupled to drive each of said shafts, a brake band for each of said brake drums adapted to loosely encircle each of said brake drums and capable of stopping the rotation of said drive shafts when placed in frictional engagement with said brake drums, two pair of spaced link members for each of said brake bands with each member of each pair having an end connected to a different end of the individual brake band, a link shaft for each of said two pairs of link members pivotally connecting the remaining ends of each pair of link members, a bifurcated block for each of said link shafts arranged to loosely receive said link shafts at the bifurcated end, a pair of spring mounting rods rigidly supported adjacent the bifurcated ends of said blocks, a spring adjustably secured to each of said rods to bear against said link members to urge the ends connected to the brake band together and thereby urge said bands into engagement with their drums, a push rod slidably mounted in said blocks to extend into and out of engagement with said link shafts, means connected to said push rods to move them into and out of engagement with their respective link shafts to thereby disengage and engage said bands with their drums, resilient latch means pivotally connected to each of said blocks and defined to extend into the path of movement of said link shafts to yieldingly allow said shafts to pass beyond same but to restrain the return of said shafts to thereby lock said brake bands in a disengaged position, a member arranged with each of said blocks and said latch means to pivot the latter to disengage said link shafts to thereby cause said brake bands to be applied to their respective drums, and electromagnetic operating means connected to each of said latter mentioned members for operating same.

3. In tape apparatus as defined in claim 2 wherein said means for operating said push rods includes means responsive to fluid under pressure for solely actuating said push rods to disengage said bands from their drums.

4. In tape apparatus as defined in claim 2 wherein said electromagnetic operating means is connected to be responsive to the de-energization of said drive motors to operate said latch means to stop said drive shafts.

References Cited in the file of this patent

UNITED STATES PATENTS

| | | |
|---|---|---|
| 996,854 | Hinckley | July 4, 1911 |
| 1,231,590 | Friedlaender | July 3, 1917 |
| 1,416,017 | Groene | May 16, 1922 |
| 1,555,987 | Kimball | Oct. 6, 1925 |
| 2,480,343 | Sully | Aug. 30, 1949 |